(12) United States Patent
Edwards

(10) Patent No.: US 7,290,030 B2
(45) Date of Patent: Oct. 30, 2007

(54) INTERNET OBJECT BASED INTERFACE FOR INDUSTRIAL CONTROLLER

(75) Inventor: Jayme Edwards, Mukwonago, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 849 days.

(21) Appl. No.: 09/904,929

(22) Filed: Jul. 13, 2001

(65) Prior Publication Data

US 2003/0051074 A1 Mar. 13, 2003

(51) Int. Cl.
*G06F 13/00* (2006.01)

(52) U.S. Cl. ...................................... 709/203

(58) Field of Classification Search .............. 709/201, 709/203, 223–224, 219; 719/330–332; 700/53, 700/83
See application file for complete search history.

(56) References Cited

U.S. PATENT DOCUMENTS

| | | |
|---|---|---|
| 5,546,584 A | 8/1996 | Lundin et al. |
| 5,848,415 A | 12/1998 | Guck |
| 6,061,603 A | 5/2000 | Papadopoulos et al. |
| 6,070,196 A | 5/2000 | Mullen, Jr. |
| 6,201,996 B1 | 3/2001 | Crater et al. |
| 6,356,529 B1 | 3/2002 | Zarom |
| 6,549,937 B1 | 4/2003 | Auerbach et al. |
| 6,591,272 B1 | 7/2003 | Williams |
| 2001/0011341 A1 | 8/2001 | Hayes, Jr. et al. |
| 2002/0067370 A1 | 6/2002 | Forney et al. |
| 2003/0105974 A1 | 6/2003 | Griffin et al. |
| 2003/0163513 A1 | 8/2003 | Schaeck et al. |
| 2004/0034799 A1 | 2/2004 | Mikami |

FOREIGN PATENT DOCUMENTS

EP  1 193 948 A2  4/2002

OTHER PUBLICATIONS

Aaron Skonnard "SOAP, The Simple Object Access Protocol", p. 1-16, Jan. 2000.*
"Algorithms for Translating Interaction Protocols into a Formal Description", Koning, Leibniz-Esisar, Grenoble, France; 1999 IEEE, pp. 810-815.
SOAP Cleans Up Interoperability Problems on the Web, JEPSEN, Perspectives, Jan./Feb. 2001, XP-002216675/XP-002216700.
Lumpp et al., "Virtual Java Devices Integration of Fieldbus Based Systems in the Internet", IECON '98, Proceedings of the 24th Annual Conference of the IEEE Industrial.
Electronics Society, Aug. 31-Sep. 4, 1998.
Don Box et al., Simple Object Access Protocol (SOAP) 1:1-W3C Note May 8, 2000.
Database Inspec 'Online!, Institute of Electrical Engieners, Stevenage, GB, 2001.
European Search Report dated Nov. 4, 2004 mailed Nov. 12, 2004 for European Patent Application Serial No. 04 02 2561, 3 pages.

* cited by examiner

*Primary Examiner*—Robert B Harrell
(74) *Attorney, Agent, or Firm*—Amin Turocy & Calvin LLP; William R. Walburn

(57) ABSTRACT

A remote operating program for a industrial controller executes on any browser enabled remote computer by connecting to Web server connected to the industrial controller to load an applet. The applet provides for a communication protocol with the server of the industrial controller that allows the applet to discover and use objects on the server that may be implemented by the remote operating program.

28 Claims, 3 Drawing Sheets

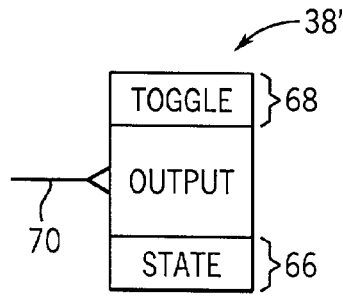
FIG. 4
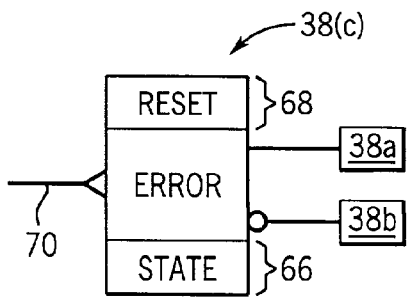
FIG. 6
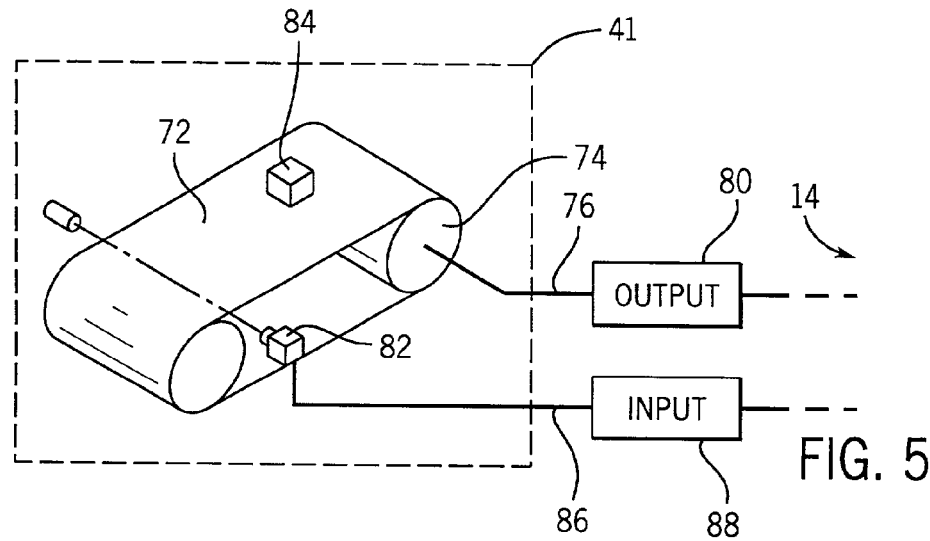
FIG. 5
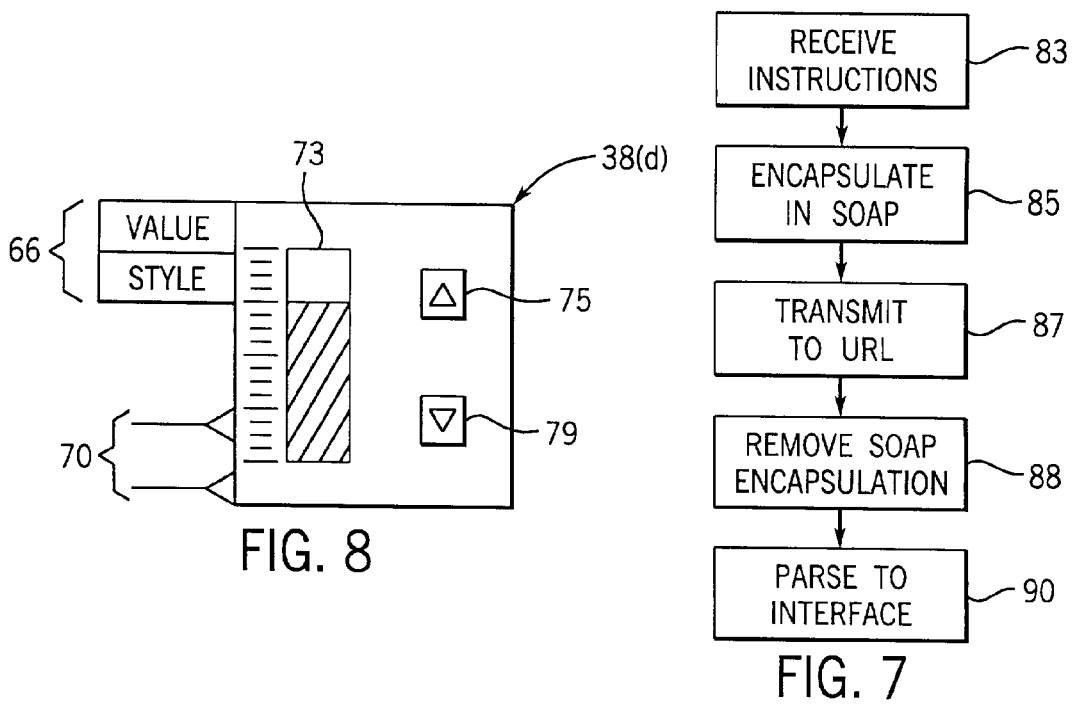
FIG. 8
FIG. 7

INTERNET OBJECT BASED INTERFACE FOR INDUSTRIAL CONTROLLER

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to controllers for industrial processes and in particular to a human-machine interface for such a controller using a Web browser program.

Industrial controllers are special purpose computers used for the control of industrial processes and the like. While executing a stored control program, they read inputs from the controlled process and, per the logic of the control program, provide outputs to the controlled process.

Industrial controllers differ from conventional computers in two major respects. First, the architecture of the industrial controller allows it to be easily reconfigured to meet the demands of the particular process being controlled. Normally, the industrial logic controller is in a modular form, and the user selects different modules to be assembled together in a rack and linked together on a backplane in the rack. Varying numbers of inputs and outputs are accommodated with input/output (I/O) modules that may also fit in the rack or in a remote rack connected to the first rack over a control network.

The adaptability of the industrial controller to the controlled process is also enabled by custom written programs executed on the industrial controller, both for the control of the industrial process and to provide human machine interfaces (HMIs), the latter which often depicts a graphic representation of all or part of the process animated to show its current operating state.

Industrial controllers also differ from conventional computers in that they must provide highly reliable and predictable operation. To achieve this end, communications between the industrial controller and I/O are carefully regulated, for example, by being subject to maximum response times, and monitored for errors.

At times, it can be desirable to monitor or control an industrial process from a site that is remote from the industrial controller and the process itself. Such remote operations are well known, for example, using dedicated phone lines and proprietary communication protocols between the industrial controller and a remote HMI. With the development of the Internet and the World Wide Web, dedicated phone lines may be replaced with Internet-based communications between a remote program and a Web server communicating with or incorporated as part of the industrial controller. The promise of the Web is that any Internet connected computer can become a remote terminal for an industrial controller.

Widespread use of Internet based remote operation of industrial controllers is hampered by the need to carry specialized software for the remote computer allowing it to communicate with the industrial controller. Programs implementing, for example, complex graphical remote human-machine interfaces, can be so large as to be cumbersome to transport and load onto the remote machine. Software maintenance of many such remote programs, each of which may be customized to a particular industrial controller, is extremely difficult.

BRIEF SUMMARY OF THE PREFERRED EMBODIMENT

The present invention provides a method for performing complex remote operations with an industrial controller, from potentially any browser-enabled computer, anywhere in the world, over the Internet. To make this practical, the remote program is reduced to an applet that may be quickly downloaded to the remote computer. The applet implements an interface that allows it to call upon a large number of software objects held in the Web server associated with the industrial controller. The applet may discover, construct and use these objects, for example, in creating a complex graphical HMI, while maintaining a small footprint in the remote computer. A persistence feature allows the instantiated objects to be saved on the Web server for the next time the applet connects.

Specifically, the present invention provides an industrial control system interface that has a first interface program executing on a remote computer to provide an interface to an industrial controller. A second interface program executes on a Web server communicating with the remote computer over the Internet and further communicating with an industrial control system controlling an industrial process through input and output data communicated with the industrial process. The first and second interface programs execute to provide a protocol so that the first interface program may discover and instance software objects related to the input and output data and stored on the Web server.

Thus it is one object of the invention to provide the development of powerful remote interfaces to an industrial controller that may be customized to the controlled process, but that may also be rapidly developed using pre-established software objects appropriate to the particular industrial controller.

The protocol provides for the communication of instructions between the first interface program and the second interface program using the SOAP protocol. Multiple instructions may be transmitted in a single SOAP protocol message.

Thus it is another object of the invention to provide a communications protocol that enjoys complete Web compatibility. The SOAP protocol allows custom instructions to be easily and efficiently passed through a standard Web server to an underlying industrial control application.

The applet may use the Java language.

Thus it is another object of the invention to provide a remote operation program that can be run in virtually every browser-enabled computer regardless of architecture or operating system. A Java applet may execute on any computer that can implement a Java Virtual Machine, such as is incorporated into the leading browser programs.

The protocol may provide for at least one of: (a) a discovery instruction to be transmitted from the first interface program that causes the second interface program to provide a list of characteristics of the software objects, (b) a constructor instruction creating an instance of a software object on the Web server, (c) a set property instruction setting a property of a software object on the Web server, (d) an invocation instruction for an invocation of a method of a software object on the Web server, (e) an event subscription instruction causing the receipt by the first interface program of event messages from software object on the Web server, and at least one persistence instruction preserving an instance of a software object on the Web server during a cessation of a communication session on the Internet between the remote computer and the Web server.

Thus it is another object of the invention to provide persistence to the objects used in the remote interface so as to provide a practical rapid interface from the remote computer.

The invention may include the steps of: (a) connecting the remote computer via a Web browser program to a first Web page providing the first interface program, (b) reading the first interface program into the remote computer and executing it at the remote computer, and (c) connecting the Web browser program to the Web server communicating with the industrial control system.

Thus it is one object of the invention to allow any browser-enabled computer with access to the Internet to provide an interface to an industrial control system without the need for the user to carry a copy of the remote interface program. It is another object of the invention to allow modification of the remote interface program to be easily distributed to many remote users even among different industrial controllers. The remote interface program can be uploaded for all users from one or a limited number of sites each time it is used.

The foregoing objects and advantages may not apply to all embodiments of the invention and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

BRIEF DESCRIPTION OF THE DRAWINGS

FIG. 4 is a graphic representation of one of the objects of the server of FIG. 3 showing its properties, methods and events;

FIG. 5 is a simplified example of an industrial process including a conveyor belt showing an output object for actuating the conveyor belt in an input object for measuring passage of objects on the conveyor belt;

FIG. 6 is a graphical representation similar to that of FIG. 4 showing construction of an object making use of the input and output objects of FIG. 5;

FIG. 7 is a flow chart showing transmission of instructions from the remote terminal to the server; and FIG. 8 is a graphical display object that may be implemented by the present invention.

DETAILED DESCRIPTION OF THE PREFERRED EMBODIMENT

Figure 1:
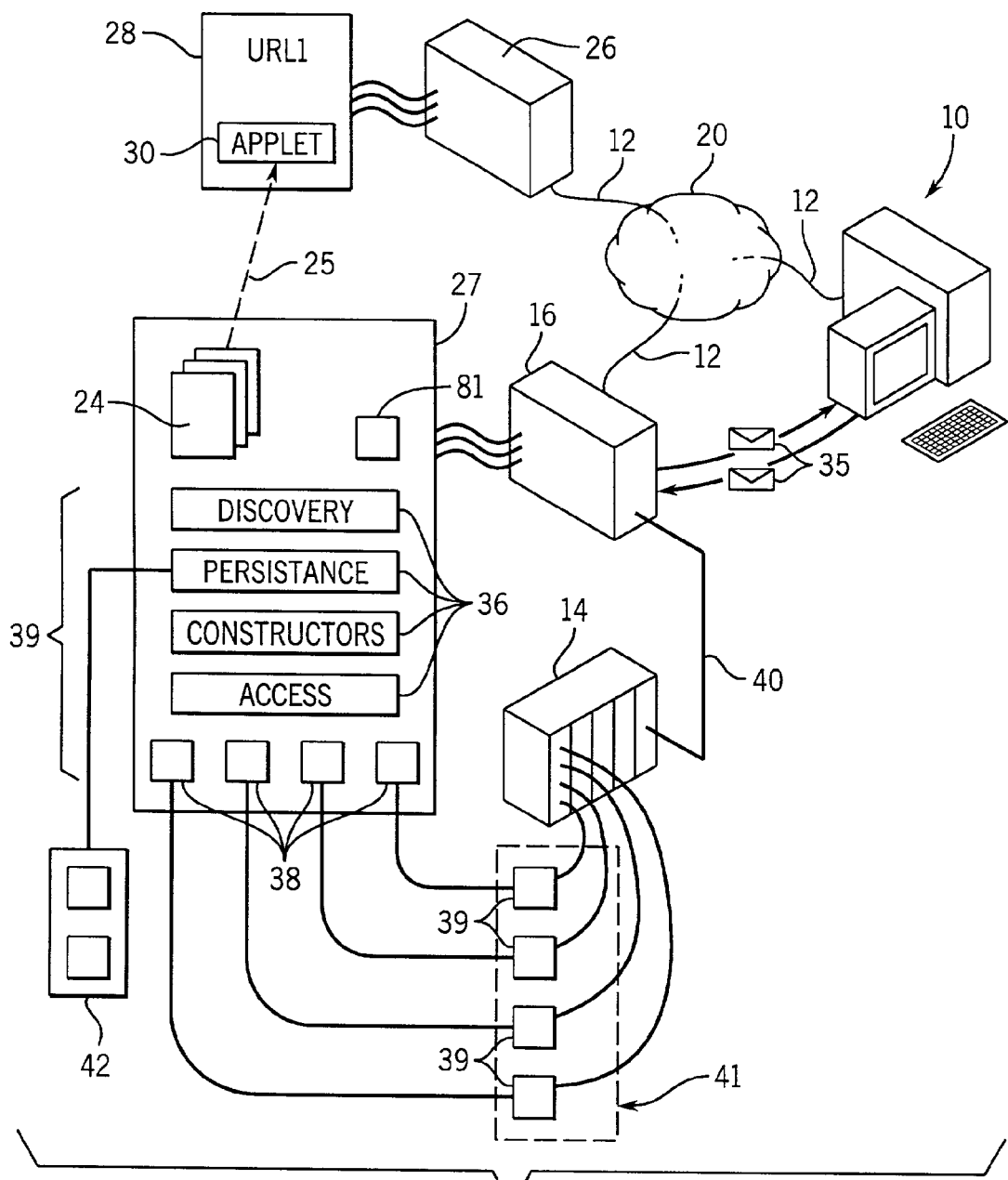
FIG. 1 is a simplified block diagram of an Internet connection between a remote browser and two servers, the first which includes an HMI applet and the second which provides an interface to an industrial controller.

Referring now to FIG. 1, the present invention will be described in the context of a human machine interface (HMI) implementable on a browser-enabled, remote computer 10. Generally, the present invention will be applicable to other remote operations requiring an interface to an industrial control system over the Internet.

Figure 3:
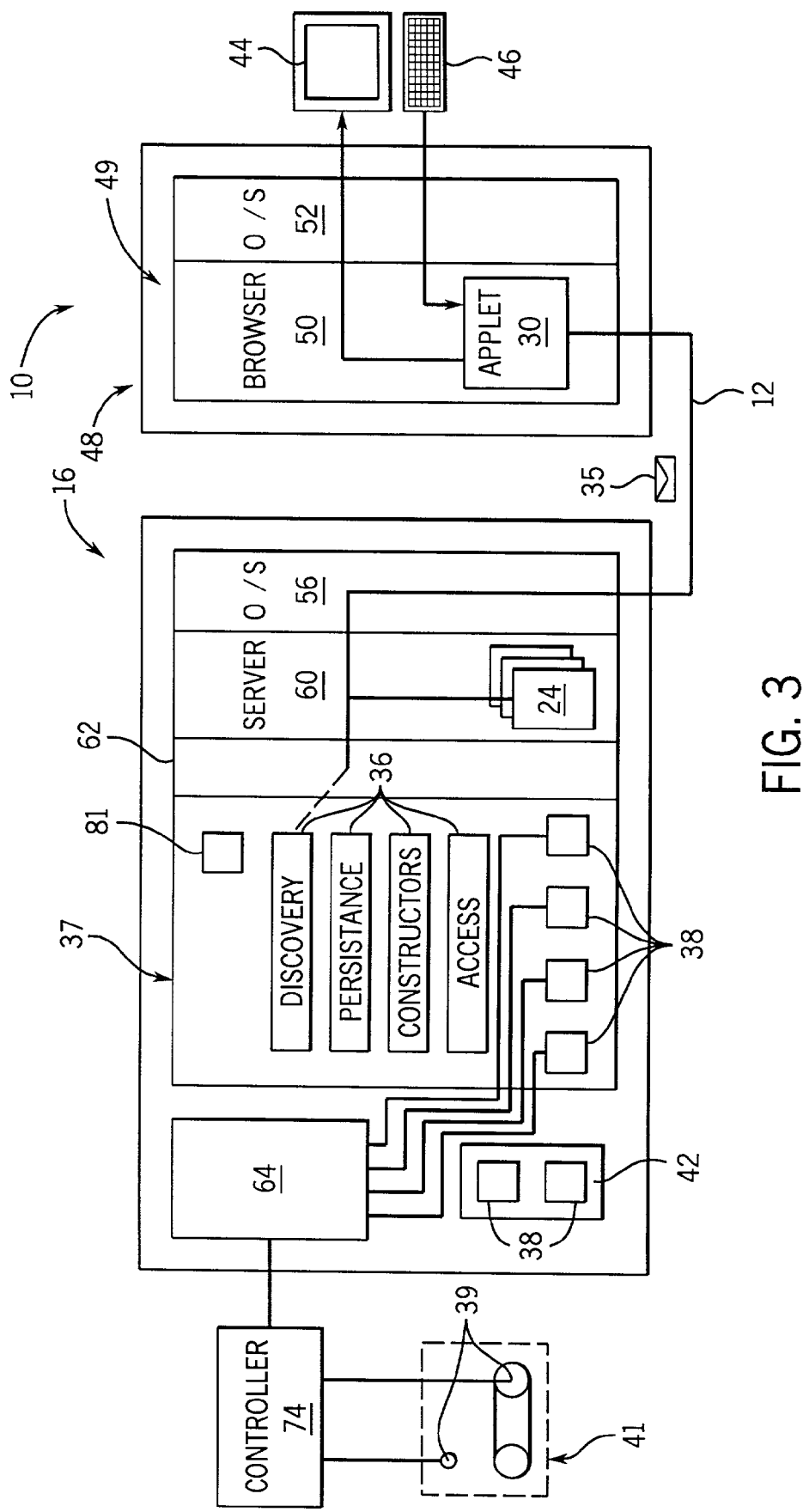
FIG. 3 is a detail block diagram of the software components of the browser and server showing structures within the server for implementing an object-based interface protocol and their connection to an external industrial controller.

Referring also to FIG. 3, the remote computer 10 includes a display screen 44 and user input device 46 such as a keyboard communicating with a processor system 48 executing stored programs 49. Typically the programs 49 will include an operating system 52 such as the Windows NT operating systems from Microsoft Corporation of Redmond, Wash. The programs 49 also include a browser 50 implementing a Java Virtual Machine (JVM), such as the Internet Explorer also commercially available from Microsoft.

The remote computer 10 may be a desktop machine as depicted or a laptop, palmtop or other browser enabled computing device.

The remote computer 10 may communicate over Internet connection 12, being a standard phone line or wireless link or other functionally equivalent medium, to the Internet 20 through which communications can be established with Web server 26 (shown only in FIG. 1) and Web server 16 through standard Internet protocol well known in the art. Web server 16 communicates in turn with an industrial controller 14 which operates to control an industrial process 41 through inputs and outputs 39. The Web servers 16 and 26 may be, for example, standard architecture servers executing the Apache server software under the Linux operating system, both commercially available as distributions from a number of sources including RedHat Software of Durham, N.C.

Referring specifically to FIG. 3, the Web server 16 executes the operating system 56 (such as Linux) and server software 60 (such as Apache) so as to serve one or more predefined Web pages 24 as will be described. The server software 60 includes a module allowing for the user of the Simple Object Access Protocol (SOAP) implemented by the Apache server such as allows for passage of object oriented instructions as will be described) using Hypertext Transfer Protocol, the standard Web protocol well known in the art. Web server 16 also holds in its memory 27 persistent storage area 42 in which parameters necessary for restoring persistent objects 38 may be stored.

Generally, the object oriented instructions are passed by the server software 60 to a parser 62 forming part of the present invention, which forwards the object oriented instructions to the server-side HMI program 37 (as will be described) which effects basic object manipulations including instantiation of new objects and invocation of object methods and transmission of object events.

Generally, the parser 62 reads the name of the object oriented instructions contained within the encapsulation of a SOAP envelope 35 and passes it to one of a number of object interface programs 36 making up the server-side HMI program 37. The SOAP envelope may contain multiple instructions and the call arrangement of the instructions can be sequential or nested (allowing the return of one call to be used as the context for another), or combination of both.

The particular object interface program 36 receiving the instruction is determined according to the instruction name and standard language parsing techniques well known in the art. Generally, the object oriented instructions will fall into the categories of object discovery, object persistence, object constructors, and object access, each indicated by a separate application program. More generally, the object-oriented instructions refer to and operate upon the objects 38 according to well-known object oriented techniques. Generally the object interface program 36 are associated with a universal resource indicator (URI) 39 and thus define an endpoint.

The objects 38 created and manipulated by the object interface programs 36, per the object oriented instructions received from the remote computer 10, are linked through a communications program 64 with the industrial controller 14, so that the objects 38 can be used as a path for reading and writing the inputs and outputs 39 of the industrial process 41. In this respect, the objects 39 serve to encapsulate input and output data, however other objects 38 not directly related to the data, for example, graphics objects having arbitrary inputs, are also contemplated.

Figure 2:
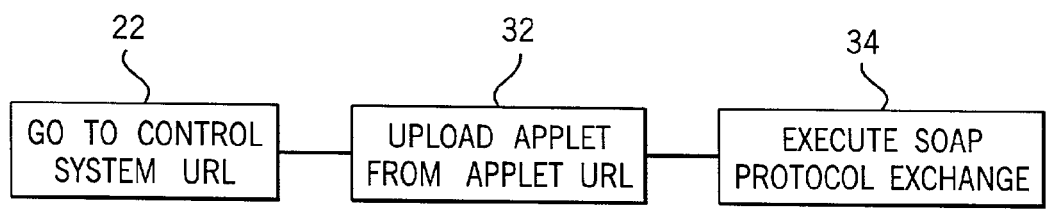
FIG. 2 is a flow chart showing the connection of the browser to the industrial controller for the implementation of an HMI.

Referring to FIGS. 1, 2 and 3, a user desiring to open an HMI with the industrial controller 14 first instructs the browser 50 executing on the remote computer 10 to connect to Web server 16 communicating with the industrial controller 14, as indicated by process block 22 of FIG. 2. The connection is made through the Internet 20 by providing the browser 50 with the universal resource locator (URL) address associated with a Web server 16.

In response to this connection, a Web page 24 corresponding to the URL is served by the Web server 16. In a preferred embodiment of the invention, the Web page 24 directs the browser 50 on remote computer 10 through the Internet 20 to a second Web page 28 on Web server 26 having a different URL from that of Web page 24. This redirection is indicated by dotted arrow 25 in FIG. 1.

Web page 28 contains an applet program 30 such as may be written in the Java language promulgated by Sun Microsystems of Palo Alto, Calif., well known in the art. The applet program 30, according to standard Web protocols, is loaded into the browser 50 of the remote computer 10 to be executed under the browser 50 as indicted by process block 32 of FIG. 2. In an alternative embodiment, the redirection of arrow 25 can be to a different Web page on the same Web server 16, however, this does not provide the benefit of centralized distribution of the applet program 30 as will become apparent from the following description. Executing the applet program 30 as indicated by process block 34 of FIG. 2 causes the browser to exchange data with the Web server 16 using the SOAP protocol for the exchange of object oriented instructions within the encapsulation of a SOAP envelope 35.

Referring now to FIG. 4, the server-side HMI program 37 provides a standard set of preconfigured I/O objects that encapsulate physical inputs and outputs 39 of the industrial controller 14. For example, output object 38' may provide a binary output corresponding to an output 39 of the industrial controller 14 such as may control a particular device in the industrial process 41. Per standard object convention, the object 38' provides a number of properties 66 that represent variables affecting the state of the object 38'. In this example of a binary output object 38', only a single property indicating either that the output is ON (i.e., TRUE or HIGH) or OFF (i.e., FALSE or LOW) is provided. As described through the agency of the communications program 64 (shown in FIG. 3) this state property 66 may be written to or read to reveal or change the corresponding output 39 associated with the industrial controller 14.

The object 38' also includes a method 68 invoking code internal to the object 38' for toggling the output state property in this case that is changing the state from ON to OFF or from OFF to ON depending on its previous state.

The output object 38 may also provide for events being signals provided by the object 38' under certain conditions, in this case, a state change event 70.

In a preferred embodiment, each input and output 39 of the industrial controller 14 will have an I/O object 38 assigned to it; however, other abstract objects 38 may also be created. As will be described, these abstract objects 38 may be constructed from the remote computer 10 and may have the properties of persistence, that is, remaining even after the remote computer 10 has logged off.

Referring now to FIG. 5, in a simple controlled process 41, a conveyor belt 72 may be operated by a motor 74 receiving a signal 76 from an output 80 of the industrial controller 14. That output 80 may have a corresponding output object 38a as shown in FIG. 6. A photoelectric sensor 82 may be positioned over the top of the conveyor belt 72 to detect the passage of parts 84 across the conveyor belt 72. A photoelectric sensor may produce a signal 86 received by input 88 communicating with the industrial controller 14 and having a corresponding object 38b as shown in FIG. 6. The two I/O objects 38a and 38b may be connected to an abstract "error" object 38c that may be instantiated by the user at the remote computer 10 using object oriented instructions passed in the SOAP envelopes 35. The error object 38c in this example, detects proper operation of the conveyor belt 72 as indicated by the state property of object 38a and regular events from the input object 38b indicating periodic interruption of the photoelectric sensor 82 by parts 84. If regular interruptions do not occur, the error object 38c produces an error state being a property 66 and an error event 70. The error object 38c may also include a reset method 68 providing for causing a resetting of its output error signal event 70. The abstract objects 38 may also include graphical display object.

As will be appreciated to those of ordinary skill in the art, the number of I/O objects 38 and the number and type of other abstract 38 (such as the error object 38c) will vary according to controlled process 41 and the desired HMI. The objects 38 may include not only logical objects as shown but also graphic display objects such as meters and buttons that may appear on the screen 44 of the remote computer to assist in communicating information about the industrial process 41.

For example, referring now to FIG. 8, an object 38d may provide for a graphic element to be communicated to the browser of remote computer 10. Here the graphic element shown is a bar graph control having a bar graph display 73 and up and down buttons 75 and 77 such as may be activated by the user to control the underlying object whose output is reflected by bar graph display 73. Here two properties 66 may exist, one holding the value of the bar graph display 73 and one setting a style from among a number of styles of the bar graph display. The display object 38d may also produce events 70 being a pressing of the up and down buttons 75 and 77. The events and the value may be set to connect to other objects either baseline objects or those created by the user. The graphic elements may generally include display elements such as meters, digital readouts, and gauges, and may also include graphic control elements such as text entry boxes, buttons and slider bars.

Through the use of the object paradigm, a centrally distributed applet program 30 may provide for the ability to construct a variety of HMI's for different industrial processes 41 invoking the objects 38 as necessary to implement certain features of the HMI through the interface of the Internet. The objects 38 thus allow the applet to be small and for the applet developer to avoid the need to write functions already provided by the objects. By providing for persistence of the constructed objects at the server side, complete flexibility of remote computer location and type is still preserved, making it possible to call up a particular HMI for an arbitrary industrial controller 14 from any browser enabled remote computer 10 anywhere in the world.

The ability to create a desired HMI through the applet program 30 for an arbitrary industrial controller 14 requires that the I/O objects 38 and other standard abstract objects 38 be discoverable remotely. Accordingly, the present invention provides a special set of object oriented instructions that allow for discovery of the objects 38 at a particular Web server 16 along with their properties, methods, events and other characteristics as follows".

TABLE I

Object Discovery Instructions

| INSTRUCTION | EXPLANATION |
|---|---|
| GetEndpoints | Reply to the remote computer 10 with a list of URIs 39 available at the Web server 16. |
| GetObjects | Reply to the remote computer 10 with a list of objects 38 available at the Web server 16 on a given Endpoint. |
| GetConstructors | Reply to the remote computer 10 with a list of all constructors for creating new objects available at the Web server 16. |
| GetProperties | Reply to the remote computer 10 for a particular object with a list of all of the object's properties. |
| GetActions | Reply to the remote computer 10 for a particular object with a list of all of the object's methods. |
| GetSubscription | Reply to the remote computer 10 for a particular object with a list of all of the object's events. |

The discovery instructions do not change with changes in the industrial process 41 (for example I/O) or even in upgrades of the applet and thus can be standardized at each Web server 16. On the other hand, the values returned by the discovery instructions change depending both on the industrial process 41 and its control, principally in the form of what objects 38 are available, allowing the precise configuration of the HMI to vary considerably under identical applet programs 30. The implementation of the object discover instructions is performed by the DISCOVER object interface programs 36 which reviews a table holding object definition as is created for the I/O objects during configuration of the industrial controller 14 and for abstract objects by the HMI program designers.

The flexibility of the HMI using the applet program requires persistence of the objects generated (so that the objects called by the HMI do not need to be re-instantiated for each session) so the present invention also provides a set of persistence instructions that provide for persistence of an object created by a remote user even after the user has logged off.

TABLE II

Object Persistence Instructions

| GetLoadParameters | Reply to the remote computer 10 with a file name for a file holding the parameters for an identified object that must be loaded for the object to be resolved into a persisted state. |
|---|---|
| GetSaveParameters | Reply to the remote computer 10 with a file name for a file holding the parameters for an identified object that must be saved for the object to be stored into a persisted state. |
| Load Object | Loads a previously instantiated and saved object. |
| Save Object | Saving a previously instantiated object using the GetSaveParameters returned file name. |

The Object persistence instructions are implements by the PERSISTENCE object interface program 36 which saves and loads the necessary instantiation data from a non volatile memory portion forming the persistent storage area 42 and which records the file name according to well known file storage techniques.

The present invention contemplates a complete customization of the HMI by the remote user and thus provides for the construction of objects necessary to create that interface according to standard object oriented techniques. In this regard, two object instantiation instructions are provided as follows:

TABLE III

Object Instantiation Instructions

| CreateObject | Respond to an instruction from the remote computer 10 to create an instance of an object based on the GetConstructors discovery performed earlier. |
|---|---|
| ReleaseObject | Respond to an instruction from the remote computer 10 to release the memeory used for a specified object. |

The object instantiation instructions are implemented by the CONSTRUCTOR object interface program 36 using well-known object construction techniques.

The final set of object access instructions provide access to the properties, methods and events of the object so that they may be read or written to as far as their properties or having their methods invoked or being notified upon events in a subscription process.

TABLE IV

Object Access Instructions

| InvokeAction | Respond to an instruction from the remote computer 10 to invoke a method of an object such as may have been revealed by the discovery instructions above. |
|---|---|
| GetProperty | Respond to an instruction from the remote computer 10 to read a property of an object as may have been revealed by the discovery instruction get properties above. |
| SetProperty | Respond to an instruction from the remote computer 10 to write to a property of an object as may have been revealed by the discovery instruction set properties above |
| Subscribe | Respond to an instruction from the remote computer 10 to subscribe to an event of an object. |
| CancelSubscription | Respond to an instruction from the remote computer 10 to cancel a subscription to an event of an object. |

The access object instructions are executed by an ACCESS object interface program 36 using object access techniques known in the art of object-oriented programming. The management of subscriptions to events is handled by notification handler 81 being part of the server side HMI program which accepts messages denoting events from enables subscriptions into an event queue and processes messages to the remote computers accordingly.

The objects may in this manner send messages to the applet program over the Internet, which provide part of an effective application programmer's interface or API.

Referring now to FIGS. 3 and 7, a typical interaction between the browser 50 on remote computer 10 and Web server 16 will start by the reception of one or a set of object oriented instruction from the applet program 30 as initiated by the user to be transmitted by the applet program 30 as indicated by process block 83.

The applet program 30 as indicated by process block 85 then encapsulates the object-oriented instruction in SOAP protocol for transmission through the browser 50 according to standard techniques used in browser operating system interaction. The browser 50 as indicated by process block 87 transmits this SOAP envelope 35 to the URL of the Web server 16 where it is received as indicated by process block 89 and the SOAP encapsulation removed by the server software 60.

The underlying object oriented instructions are passed to the parser 62 as indicated by process block 90 and then passed to the server-side HMI program 37 for processing as has been described.

It is specifically intended that the present invention not be limited to the embodiments and illustrations contained herein, but that modified forms of those embodiments including portions of the embodiments and combinations of elements of different embodiments also be included as come within the scope of the following claims.

I claim:

1. An industrial control system interface comprising:
   a first interface program executing on a remote computer to provide an interface screen for an industrial controller;
   a second interface program executing on a Web server communicating with the remote computer over the Internet and further communicating with an industrial control system controlling an industrial process through input and output data communicated with the industrial process;
   the first and second interface program execute to provide a protocol so that the first interface program discovers and instances software objects related to the input and output data and stored on the Web server; the first interface program uses pre-written software objects to implement the interface; and
   the protocol provides for at least one persistence instruction that preserves an instance of a software object on the Web server after cessation of a communication session between the remote computer and the Web server.

2. The industrial control system interface of claim 1, the SOAP protocol provides for a discovery instruction to be transmitted from the first interface program that causes the second interface program to provide characteristics of the software objects.

3. The industrial control system interface of claim 2, the characteristics are object properties, object constructors, object methods, and object events.

4. The industrial control system interface of claim 1, the protocol provides for the communication of instructions between the first interface program and the second interface program using the SOAP protocol.

5. The industrial control system interface of claim 1, multiple instructions are transmitted in a single SOAP protocol message and wherein a call arrangement of the SOAP protocol is selected from the group consisting of sequential, nested, and a combination of both.

6. The industrial control system interface of claim 1, the protocol provides for a constructor instruction creating an instance of a software object on the Web server.

7. The industrial control system interface of claim 1, the protocol provides for a set property instruction setting a property of a software object on the Web server.

8. The industrial control system interface of claim 1, the protocol provides for an invocation of a method of a software object on the Web server.

9. The industrial control system interface of claim 1, the protocol provides for an event subscription instruction causing the receipt by the first interface program of event messages from software objects on the Web server.

10. The industrial control system interface of claim 1, the first and second interface programs further execute to
   connect the remote computer using a Web browser program to a first Web page providing the first interface program;
   read the first interface program into the remote computer and execute it at the remote computer; and
   connect the Web browser program to the Web server communicating with the industrial control system.

11. The industrial control system interface of claim 1, the software objects are stored on a Web server other than the Web server communicating with the industrial control system.

12. The industrial control system interface of claim 1, the first interface program is a Java applet.

13. The industrial control system interface of claim 1, the software objects stored on the Web server include graphic display elements.

14. The industrial control system interface of claim 1, the software objects stored on the Web server include graphic control elements.

15. A method of remote communication with an industrial control system
   executing a first interface program on a remote computer to provide an interface screen for an industrial controller;
   executing a second interface program on a Web server communicating with the remote computer over the Internet and further communicating with an industrial control system controlling an industrial process through input and output data communicated with the industrial process; and
   the first and second interface programs further execute to provide a protocol so that the first interface program may discover and instance software objects related to the input and output data and stored on the Web server, the protocol calls for a persistence command that retains a copy of a software object on the Web server after communication between the remote computer and the Web server is terminated; and
   the first interface program may use pre-written software objects to implement the interface.

16. The method of claim 15, the SOAP protocol provides for a discovery instruction to be transmitted from the first interface program that causes the second interface program to provide a list of characteristics of the software objects.

17. The method of claim 16, the characteristics are object properties, object constructors, object methods and object events.

18. The method of claim 15, the protocol provides for the communication of instructions between the first interface program and the second interface program using the SOAP protocol.

19. The method of claim 15, multiple instructions are transmitted in a single SOAP protocol message and wherein a call arrangement of the SOAP protocol is selected from the group consisting of sequential, nested, and a combination of both.

20. The method of claim 15, the protocol provides for a constructor instruction creating an instance of a software object on the Web server.

21. The method of claim 15, the protocol provides for an set property instruction setting a property of a software object on the Web server.

22. The method of claim 15, the protocol provides for an invocation of a method of a software object on the Web server.

23. The method of claim 15, the protocol provides for an event subscription instruction causing the receipt by the first interface program of event messages from software objects on the Web server.

24. The method of claim 15, including the steps of:
connecting the remote computer via a Web browser program to a first Web page providing the first interface program;
reading the first interface program into the remote computer and executing it at the remote computer; and
connecting the Web browser program to the Web server communicating with the industrial control system.

25. The method of claim 15, the software objects are stored on a Web server other than the Web server communicating with the industrial control system.

26. The method of claim 15, the first interface program is a Java applet.

27. The method of claim 15, the software objects stored on the Web server include graphic display elements.

28. The method of claim 15, the software objects stored on the Web server include a graphic control elements.

* * * * *